No. 666,611. Patented Jan. 22, 1901.
J. AITCHISON.
BINOCULAR GLASSES.
(Application filed July 3, 1899.)
(No Model.) 2 Sheets—Sheet 1.

Witnesses
Inventor
James Aitchison
By James L. Norris.
Atty

No. 666,611. Patented Jan. 22, 1901.
J. AITCHISON.
BINOCULAR GLASSES.
(Application filed July 3, 1899.)

(No Model.) 2 Sheets—Sheet 2.

Witnesses:
C. D. Kesler
W. Parker

Inventor
James Aitchison
By James L. Norris.
Atty

UNITED STATES PATENT OFFICE.

JAMES AITCHISON, OF LONDON, ENGLAND.

BINOCULAR GLASSES.

SPECIFICATION forming part of Letters Patent No. 666,611, dated January 22, 1901.

Application filed July 3, 1899. Serial No. 722,704. (No model.)

*To all whom it may concern:*

Be it known that I, JAMES AITCHISON, optician, a subject of the Queen of Great Britain, residing at 47 Fleet street, London, England, have invented certain new and useful Improvements in Binocular Glasses, of which the following is a specification.

The object of my invention is to provide means whereby the eyepieces may be readily adjusted to suit the various distances between the eyes of the users.

According to my invention I fit the eye and object glasses in their tubes in positions eccentric to the barrels and in the case of prismatic binoculars at opposite sides. The barrels are so fitted to the frame as to be capable of being rotated in such frame upon their own centers, the rotation of both barrels being made simultaneous by means of segmental toothed racks attached to the barrels and gearing together.

In order that my said invention may be particularly described and ascertained, reference is hereby made to the accompanying drawings, in which similar letters of reference indicate corresponding parts.

Figure 1:
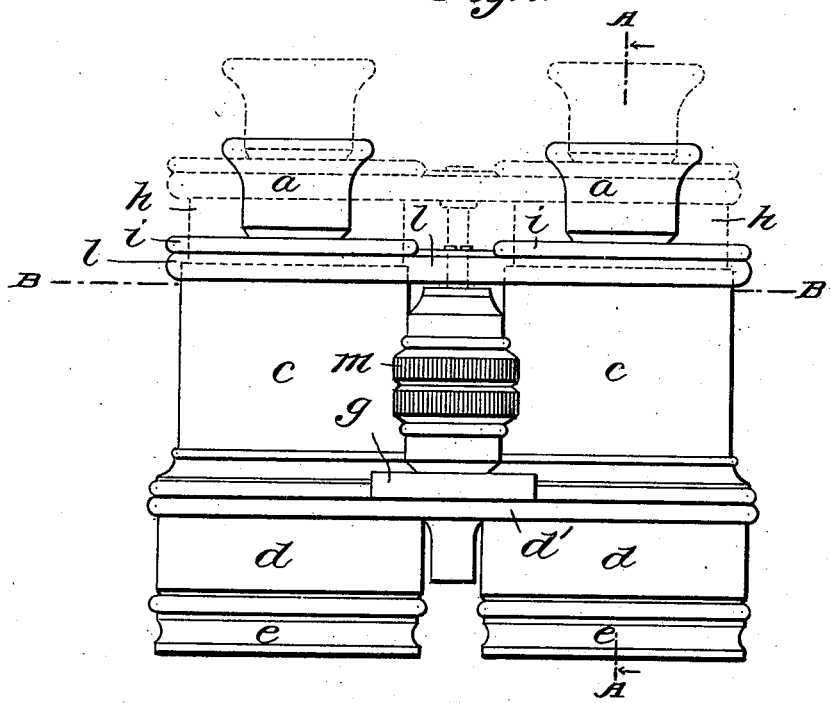
Figure 2:
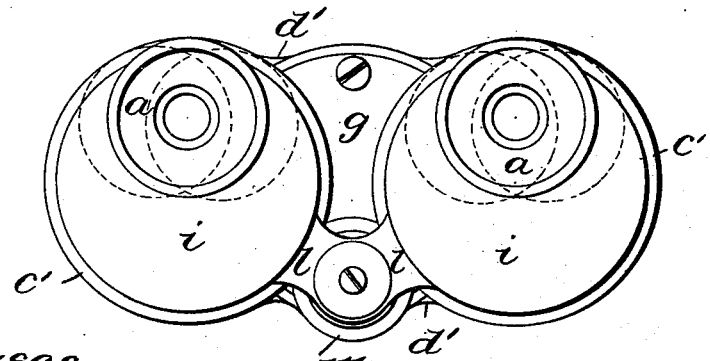
Figure 3:
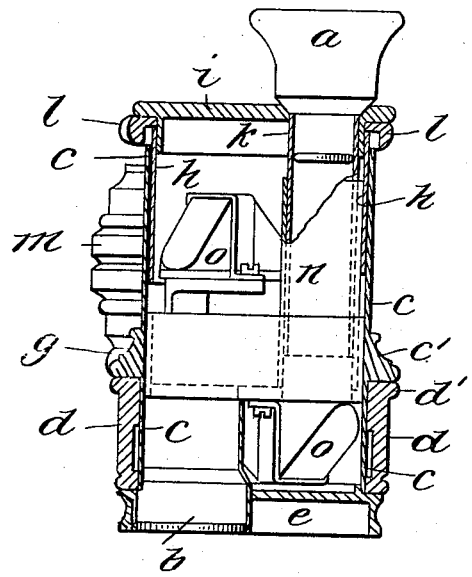
Figure 4:
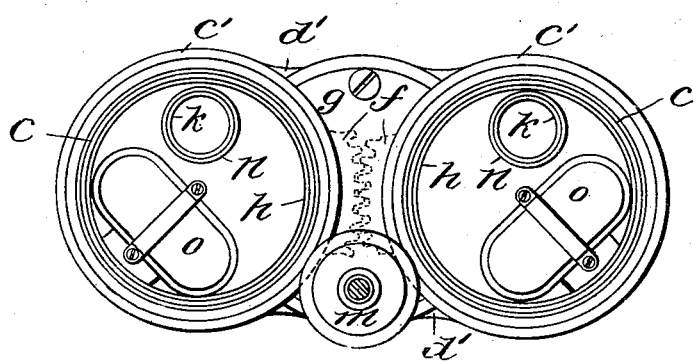

Figure 1 is an elevation. Fig. 2 is a plan. Fig. 3 is a part section on the line A A of Fig. 1. Fig. 4 is a section on the line B B of Fig. 1.

The drawings illustrate the mode of applying my invention to a prismatic binocular, from which its application to other binocular glasses will be readily understood.

$a$ are the eyepieces, and $b$ are the object-pieces, all of which are mounted eccentrically in the barrels $c$ $c$, as shown in Figs. 2, 3, and 4. The barrels $c$ are fitted in sockets $d$, integral with the frame $d'$, in which they are free to rotate and in which they are secured by dished caps $e$ and screws or other well-known means. The object-pieces $b$ pass through the said caps $e$, as shown in Fig. 3, the latter serving to support the instrument and to protect the object-pieces. The two barrels $c$ $c$ are geared together by segmental toothed racks $f$, (shown by dotted lines in Fig. 4,) said racks being attached to the flanges $c'$ of the barrels or formed integral therewith to insure a simultaneous rotation of the barrels. Preferably the toothed segments are inclosed in a plate or cover $g$, attached to the frame, the flanges of the cover serving to limit the amount of rotation.

In order to allow of focusing appliances being fitted, I provide shorter barrels $h$ $h$, which are securely attached to the covers $i$, in which the tubes $k$, carrying the eyepieces $a$, are also fixed. The covers $i$ are mounted to rotate in the top frame $l$, connected with the focusing-screw arrangement $m$. The tubes $k$ fit telescopically in tubes $n$, fixed in the barrels $c$, so as to rotate therewith in such a manner that the tubes $k$ may be partly inserted in or withdrawn from the fixed tubes $n$ by the focusing appliance and also to simultaneously revolve the eyepieces and covers $i$ with the barrel $c$.

The other parts of the prismatic binocular glass shown are well known and need no particular description, $o$ being the prisms. The dotted lines in Figs. 1 and 2 indicate, respectively, a position obtained after manipulating the focusing appliance $m$ and the approximate range of motion of the eyepieces $a$, whereby the distance between them is capable of being adjusted to the user.

I claim—

1. In an optical glass of the character described, the combination of the intergeared barrels, the circular frames, and the tubes two arranged in each barrel and eccentrically therewith and carrying the eye and object lenses, respectively, said barrels being loosely arranged one in each frame and concentrically therewith, substantially as set forth.

2. In an optical glass of the character described, a pair of rotatable barrels, a tube eccentrically mounted in each of said barrels and carrying an object-piece, a longitudinally-adjustable barrel arranged in each of said barrels, a tube eccentrically connected to each of the longitudinally-adjustable barrels, and eyepieces arranged in suitable relation to each of said tubes, and means for longitudinally adjusting said barrels.

3. In an optical glass of the character described, a pair of rotatable barrels, a tube eccentrically mounted in each of said barrels and carrying an object-piece, a longitudinally-adjustable barrel mounted concentrically in each of said barrels, a telescopic tube mounted eccentrically in each of said adjustable barrels and carrying eyepieces.

4. In an optical glass of the character described, a pair of rotatable barrels, object-pieces suitably mounted in said barrels, a longitudinally-adjustable barrel concentrically mounted in each of said barrels, a tube eccentrically mounted in each of said longitudinally-adjustable barrels, eyepieces carried by each of the said tubes, and means for longitudinally adjusting the concentrically-mounted barrels.

In testimony whereof I have hereunto set my hand in presence of two subscribing witnesses.

JAMES AITCHISON.

Witnesses:
    GEORGE C. DOWNING,
    WALTER J. SKERTEN.